US008250015B2

(12) United States Patent
Li et al.

(10) Patent No.: US 8,250,015 B2
(45) Date of Patent: Aug. 21, 2012

(54) GENERATING IMPLICIT LABELS AND TRAINING A TAGGING MODEL USING SUCH LABELS

(75) Inventors: Xiao Li, Bellevue, WA (US); Ye-Yi Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 706 days.

(21) Appl. No.: 12/419,336

(22) Filed: Apr. 7, 2009

(65) Prior Publication Data

US 2010/0256969 A1    Oct. 7, 2010

(51) Int. Cl.
G06F 17/00 (2006.01)
G06N 5/00 (2006.01)
(52) U.S. Cl. .............................. 706/45; 700/47; 707/723
(58) Field of Classification Search ...................... 706/45
See application file for complete search history.

(56) References Cited

U.S. PATENT DOCUMENTS

| | | | | |
|---|---|---|---|---|
| 2004/0221237 A1* | 11/2004 | Foote et al. | | 715/700 |
| 2005/0021490 A1* | 1/2005 | Chen et al. | | 707/1 |
| 2005/0256866 A1 | 11/2005 | Lu et al. | | |
| 2006/0277190 A1 | 12/2006 | Fox et al. | | |
| 2007/0038616 A1 | 2/2007 | Guha | | |
| 2007/0168331 A1 | 7/2007 | Reddy et al. | | |
| 2008/0005064 A1 | 1/2008 | Sarukkai | | |
| 2008/0126327 A1 | 5/2008 | Dettinger et al. | | |
| 2009/0319456 A1* | 12/2009 | Consul et al. | | 706/21 |

OTHER PUBLICATIONS

Bose, et al., "AstroDAS: Sharing Assertions across Astronomy Catalogues through Distributed Annotation," IPAW 2006, LNCS 4145, retrieved at <<http://homepages.inf.ed.ac.uk/rbose/pubs/200605_IPAW/bose_ipaw06.pdf>>, 2006, 10 pages.

Cassidy, Steve, "Compiling Multi-Tiered Speech Databases into the Relational Model: Experiments with the Emu System," In Proceedings of Eurospeech '99, Budapest, Sep. 1999, retrieved at <<http://emu.sourceforge.net/old/eurospeech99.shtml>>, Mar. 10, 2009, 8 pages.

Welch, et al., "Automatically Identifying Localizable Queries," Proceedings of the 31st Annual International ACM SIGIR Conference on Research and Development in Information Retrieval, 2008, retrieved at <<http://oak.cs.ucla.edu/~cho/papers/p507-welch.pdf>>, pp. 507-514.

Tang, et al., "Extraction and Mining of an Academic Social Network," Proceeding of the 17th International Conference on World Wide Web, 2008, retrieved at <<http://www2008.org/papers/pdf/p1193-tang.pdf>>, pp. 1193-1194.

(Continued)

Primary Examiner — Omar Fernandez Rivas
Assistant Examiner — Kalpana Bharadwaj

(57) ABSTRACT

A training module is described for training a conditional random field (CRF) tagging model. The training module trains the tagging model based on an explicitly-labeled training set and an implicitly-labeled training set. The explicitly-labeled training set includes explicit labels that are manually selected via human annotation, while the implicitly-labeled training set includes implicit labels that are generated in an unsupervised manner. In one approach, the training module can train the tagging model by treating the implicit labels as non-binding evidence that has a bearing on values of hidden state sequence variables. In another approach, the training module can treat the implicit labels as binding or hard evidence. A labeling system is also described for providing the implicit labels.

18 Claims, 10 Drawing Sheets

OTHER PUBLICATIONS

Viola, et al., "Learning to Extract Information from Semistructured Text using a Discriminative Context Free Grammar," Proceedings of the 28th Annual International ACM SIGIR Conference on Research and Development in Information Retrieval, 2005, retrieved at <<http://research.microsoft.com/en-us/um/people/viola/pubs/docextract/contact_sigir05.pdf>>, 8 pages.

Grenager, et al., "Unsupervised Learning of Field Segmentation Models for Information Extraction," Proceedings of the 43rd Annual Meeting of the ACL, 2005, pp. 371-378.

Haghighi, et al., "Prototype-Driven Learning for Sequence Models," Proceedings of the Main Conference on Human Language Technology Conference of the North American Chapter of the Association of Computational Linguistics, 2006, retrieved at <<http://www.eecs.berkeley.edu/~aria42/pubs/naacl06-posinduction.pdf>>, 8 pages.

Jiao, et al., "Semi-Supervised Conditional Random Fields for Improved Sequence Segmentation and Labeling," Proceedings of the 21st International Conference on Computational Linguistics and 44th Annual Meeting of the ACL, 2006, retrieved at <<http://www.aclweb.org/anthology-new/P/P06/P06-1027.pdf>>, pp. 209-216.

Mann, et al., "Generalized Expectation Criteria for Semi-Supervised Learning of Conditional Random Fields," in Proceedings of Association of Computational Linguistics, 2008, retrieved at <<http://gideon.mann.googlepages.com/xr-feat-crf3.pdf>>, 9 pages.

Abney, Steven, "Understanding the Yarowsky Algorithm," Association for Computational Linguistics, 2004, retrieved at <<http://www.vinartus.net/spa/03c-v7.pdf>>, 30 pages.

Arasu, et al., "Extracting Structured Data from Web Pages," in Proceedings of the 2003 ACM SIGMOD International Conference on Management of Data, 2003, retrieved at <<http://infolab.stanford.edu/~arvind/papers/extract-sigmod03.pdf>>, 12 pages.

Bilmes, Jeff, On Soft Evidence in Bayesian Networks, Technical Report UWEETR-2004-0016, University of Washington, 2004, retrieved at <<https://www.ee.washington.edu/techsite/papers/documents/UWEETR-2004-0016.pdf>>, 24 pages.

Canisius, et al., "Bootstrapping Information Extraction from Field Books," in Proceedings of the 2007 Conference on Empirical Methods in Natural Language Processing, 2007, retrieved at <<http://www.aclweb.org/anthology/D/D07/D07-1087.pdf>>, pp. 827-836.

Mann, et al., "Learning From Labeled Features Using Generalized Expectation Criteria," in Proceedings of the 31st Annual International ACM SIGIR Conference on Research and Development in Information Retrieval, 2008, retrieved at <<http://www.cs.umass.edu/~mccallum/papers/druck08sigir.pdf>>, 8 pages.

Grandvalet, et al., Semi-Supervised Learning by Entropy Minimization, in Advances in Neural Information Processing Systems, 2004, retrieved at <<retrieved at <<http://www.iro.umontreal.ca/~lisa/pointeurs/semi-supervised-entropy-nips2004.pdf>>, 8 pages.

Lafferty, et al., "Conditional Random Fields: Probabilistic Models for Segmenting and labeling sequence data," in Proceedings of the International Conference on Machine Learning, 2001, retrieved at <<http://www.cis.upenn.edu/~pereira/papers/crf.pdf>>, 8 pages.

Li, et al., Learning Query Intent from Regularized Click Graph, in SIGIR'08: Proceedings of the 31st Annual International ACM SIGIR Conference on Research and Development in Information Retrieval, Jul. 2008, retrieved at <<http://research.microsoft.com/apps/pubs/default.aspx?id=75219>>, 8 pages.

Pinto, et al., "Table Extraction Using Conditional Random Fields," in Proceedings of the 26th Annual International ACM SIGIR Conference on Research and Development in Information Retrieval, 2003, retrieved at <<http://www.cs.umass.edu/~mccallum/papers/crft-able-sigir2003.pdf>>, 8 pages.

Quattoni, et al., "Hidden Conditional Random Fields," IEEE Transaction on Pattern Analysis and Machine Intelligence, 29(10), 2007, ACM abstract only, retrieved at <<http://portal.acm.org/citation.cfm?id=1313265>>, retrieved on Apr. 3, 2009, 4 pages.

Suzuki, et al., "Semi-Supervised Sequential Labeling and Segmentation Using Giga-word Scale Unlabeled Data," in Proceedings of the 46th Annual Meeting of the ACL: Human Language Technologies, 2008, pp. 665-673.

Wong et al., "An Unsupervised Framework for Extracting and Normalizing Product Attributes from Multiple Web Sites, " Proceedings of the 31st Annual International ACM SIGIR Conference on Research and Development in Information Retrieval, 2008, retrieved at <<http://www.cse.cuhk.edu.hk/~wongtl/papers/wongtl-sigir08.pdf>>, 8 pages.

Yarowsky, David, "Unsupervised Word Sense Sisambiguation Rivaling Supervised Methods," in Proceedings of the 33rd Annual Meeting of the Association for Computational Linguistics, 1995, retrieved at <<http://acl.ldc.upenn.edu/P/P95/P95-1026.pdf>>, 8 pages.

Zhao, et al., "Exploiting Structured Reference Data for Unsupervised Text Segmentation with Conditional Random Fields," in Proceedings of the SIAM International Conference on Data Mining, 2008, retrieved at <<http://www.siam.org/proceedings/datamining/2008/dm08_38_zhao.pdf>>, 12 pages.

Zhu, et al., "Webpage understanding: an Integrated Approach," in Proceedings of the 13th ACM SIGKDD International Conference on Knowledge Discovery and Data Mining, 2007, retrieved at <<http://research.microsoft.com/en-us/um/people/znie/sigkdd2007_extraction.pdf>>, 10 pages.

* cited by examiner

| FIELDS | EXAMPLE USE IN QUERIES | |
|---|---|---|
| BRAND | <u>ACME</u> POWERSHOT Z250 | ⎫ |
| MODEL | ACME <u>POWERSHOT Z250</u> | ⎬ 202 |
| TYPE | ACME <u>DIGITAL CAMERA</u> SILVER | |
| ATTRIBUTE | ACME DIGITAL CAMERA <u>SILVER</u> | ⎭ |
| MERCHANT | DIGITAL CAMERAS AT <u>BEST BUY</u> | ⎫ |
| SORTORDER | <u>BEST</u> DIGITAL CAMERAS | |
| BUYINGINTENT | <u>BUY</u> ACME DIGITAL CAMERA | ⎬ 204 |
| RESEARCHINTENT | DIGITAL CAMERAS <u>REVIEW</u> | |
| OTHER | DIGITAL CAMERAS <u>AT</u> JIM'S PHOTOSHOP | ⎭ |

FIG. 2

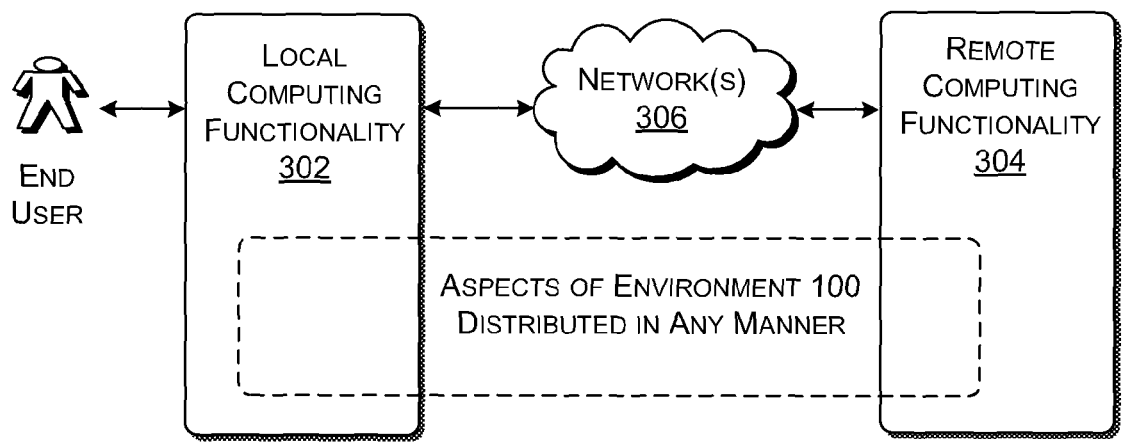

FIG. 3

QUERY → "CHEAP ACME STREETSMART 2820 GPS"
QUERY → PAGE XYZ FOR ACME STREETSMART PRODUCT
QUERY → TITLE OF PAGE: "ACME STREETSMART 2820"
QUERY → SOURCE METADATA
        MANUFACTURER: ACME
        MODEL: STREETSMART 2820
        DEVICE TYPE: GPS RECEIVERS
QUERY → TARGET METADATA
        BRAND: ACME
        MODEL: STREETSMART 2820
        TYPE: GPS RECEIVERS
| CHEAP | ACME | STREETSMART | 2820 | GPS |
|-------|-------|-------------|-------|------|
| NULL | BRAND | MODEL | MODEL | TYPE |
FIG. 5

GENERATING IMPLICIT LABELS AND TRAINING A TAGGING MODEL USING SUCH LABELS

BACKGROUND

Conditional random field (CRF) models are commonly used in sequential labeling tasks, such as part-of-speech tagging and information extraction. In an application phase of operation, a CRF model accepts an input sequence x having T tokens, e.g., x=(token$_1$, token$_2$, . . . token$_T$). The CRF model determines a series of labels y=(label$_1$, label$_2$, . . . label$_T$) that are most likely associated with the tokens in the input sequence. For example, a CRF model can assign part-of-speech labels to words of an input sentence.

In a training phase of operation, one or more analysts may be asked to manually annotate data in a training set with labels. Based on the manually-labeled training set, a training module then determines model parameters which maximize an identified training objective. However, in some cases, it may not be feasible to provide a training set that is large enough to produce a CRF model with desired accuracy. There may be additional shortcomings in known CRF training approaches.

SUMMARY

A training module is described for training a conditional random field (CRF) tagging model based on an explicitly-labeled training set and an implicitly-labeled training set. The explicitly-labeled training set provides explicit labels that are manually selected for a set of queries. The implicitly-labeled training set includes implicit labels that are generated by a labeling system for another set of queries. The labeling system may generate the implicit labels in an unsupervised manner (or partially unsupervised manner).

According to another illustrative aspect, the training module can train the tagging model by treating the implicit labels as hard evidence or soft evidence.

In a hard evidence approach, the training module treats the implicit labels as fixing corresponding state sequence variables. Further, the training module treats any state sequence variable for which there is a missing label as a hidden variable.

In a soft evidence approach, the training module treats a state sequence as composed of hidden variables. The training module treats the implicit labels as soft evidence that has a bearing on values of the state sequence variables. The soft evidence is non-binding in the sense that it does not necessarily fix the values of the state sequence variables (as opposed to the hard evidence approach).

According to another illustrative aspect, in the soft evidence approach, the training module may generate the tagging model by maximizing a training objective log p(z|x)=log $\Sigma_y$ p(y, z|x), where z corresponds to implicit label information, x corresponds to query information, and y corresponds to state variable information. The training module can use an expectation-maximization (EM) algorithm to optimize the training objective, a Viterbi algorithm, or some other algorithm.

According to another illustrative aspect, the training objective applies a representation of conditional probability that includes, in part, a soft evidence feature function. The soft evidence feature function expresses an influence of the implicit labels in training the tagging model. The representation of conditional probability may also include a weighting parameter that controls an extent of influence of the implicit labels in the training operation.

According to another illustrative aspect, the soft evidence approach can be used for other tagging applications, that is, other than a query-tagging application.

According to another illustrative aspect, a labeling system is described for providing the implicit labels. In one approach, the labeling system operates by identifying items associated with queries. For example, the items may correspond to network-accessible pages selected by users after submitting the queries (as identified, for example, in a click store maintained by a search engine). The labeling system then extracts information (such as titles) from the items and uses the extracted information to identify schema information in a descriptive store (such as a product database or the like). The schema information in the descriptive store may be expressed in a source schema. If so, the labeling system can map the schema information from the source schema to a target schema. The labeling system can then define the implicit labels based on the schema information in the target schema.

Among other potential characteristics, the training module can provide a robust tagging model by applying a potentially large quantity of implicit labels in a training operation. Further, the labeling system provides an efficient mechanism for extracting the implicit labels in an unsupervised or at least a partially unsupervised manner.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 shows an illustrative set of labels in a target schema that can be used to tag queries.

FIG. 3 shows one illustrative implementation of the environment of FIG. 1.

FIG. 5 shows an illustrative application of the labeling system of FIG. 4.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an illustrative approach for training a conditional random field (CRF) tagging model based on a combination of explicit labels and implicit labels. The disclosure also sets forth an illustrative approach for providing the implicit labels in an unsupervised manner (or a partially unsupervised manner).

This disclosure is organized as follows. Section A describes illustrative systems for training and applying a tagging model. Section B describes illustrative methods which explain the operation of the systems of Section A. And Section C describes illustrative computing functionality that can be used to implement any aspect of the features described in Sections A and B.

Figure 13:
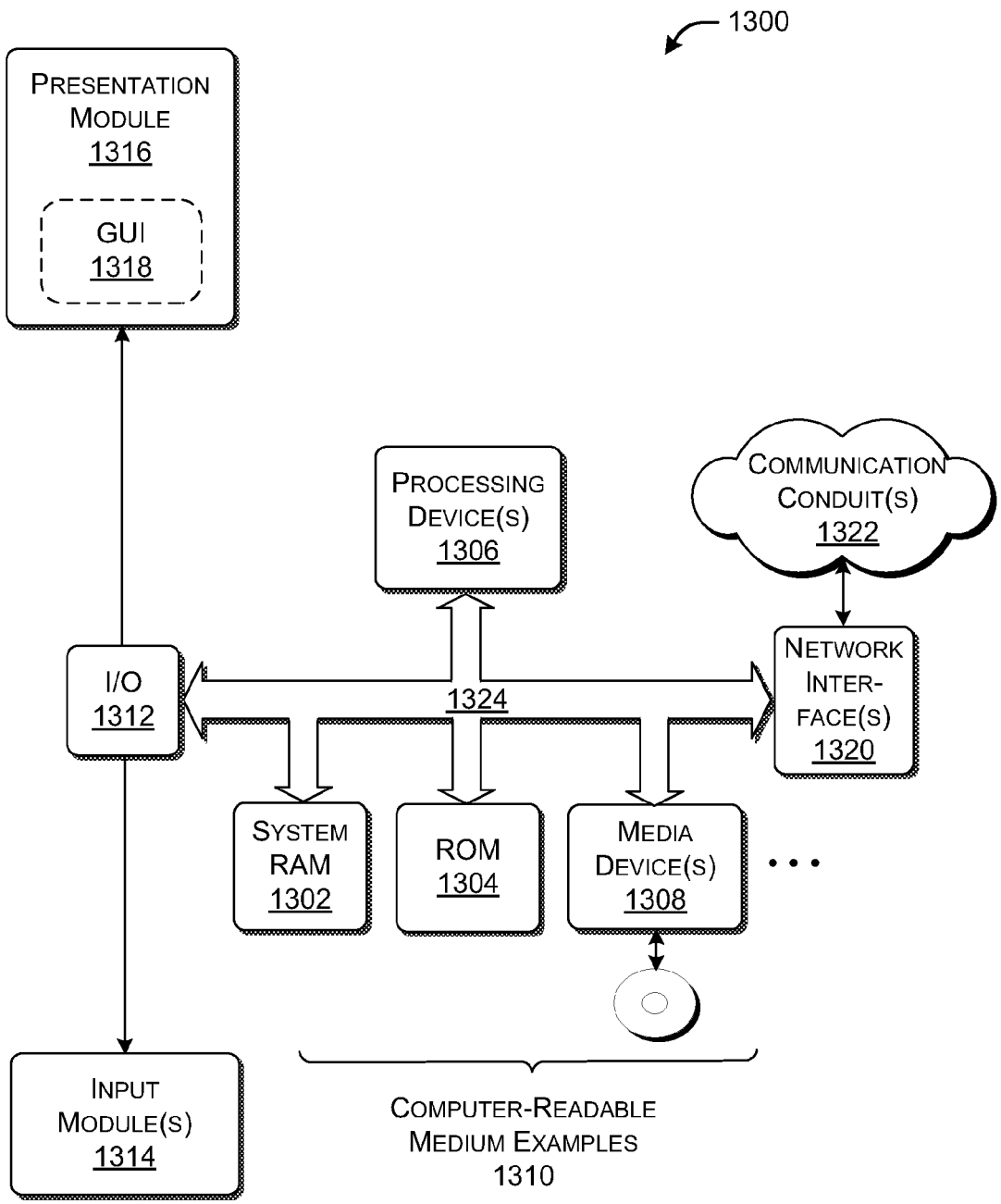
FIG. 13 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 13, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented by software, hardware (e.g., discrete logic components, etc.), firmware, manual processing, etc., or any combination of these implementations.

As to terminology, the phrase "configured to" encompasses any way that any kind of functionality can be constructed to perform an identified operation. The functionality can be configured to perform an operation using, for instance, software, hardware (e.g., discrete logic components, etc.), firmware, etc., and/or any combination thereof.

The term "logic" encompasses any functionality for performing a task. For instance, each operation illustrated in the flowcharts corresponds to logic for performing that operation. An operation can be performed using, for instance, software, hardware (e.g., discrete logic components, etc.), firmware, etc., and/or any combination thereof.

A. Illustrative Systems
A. 1. Overview of System

Figure 1:
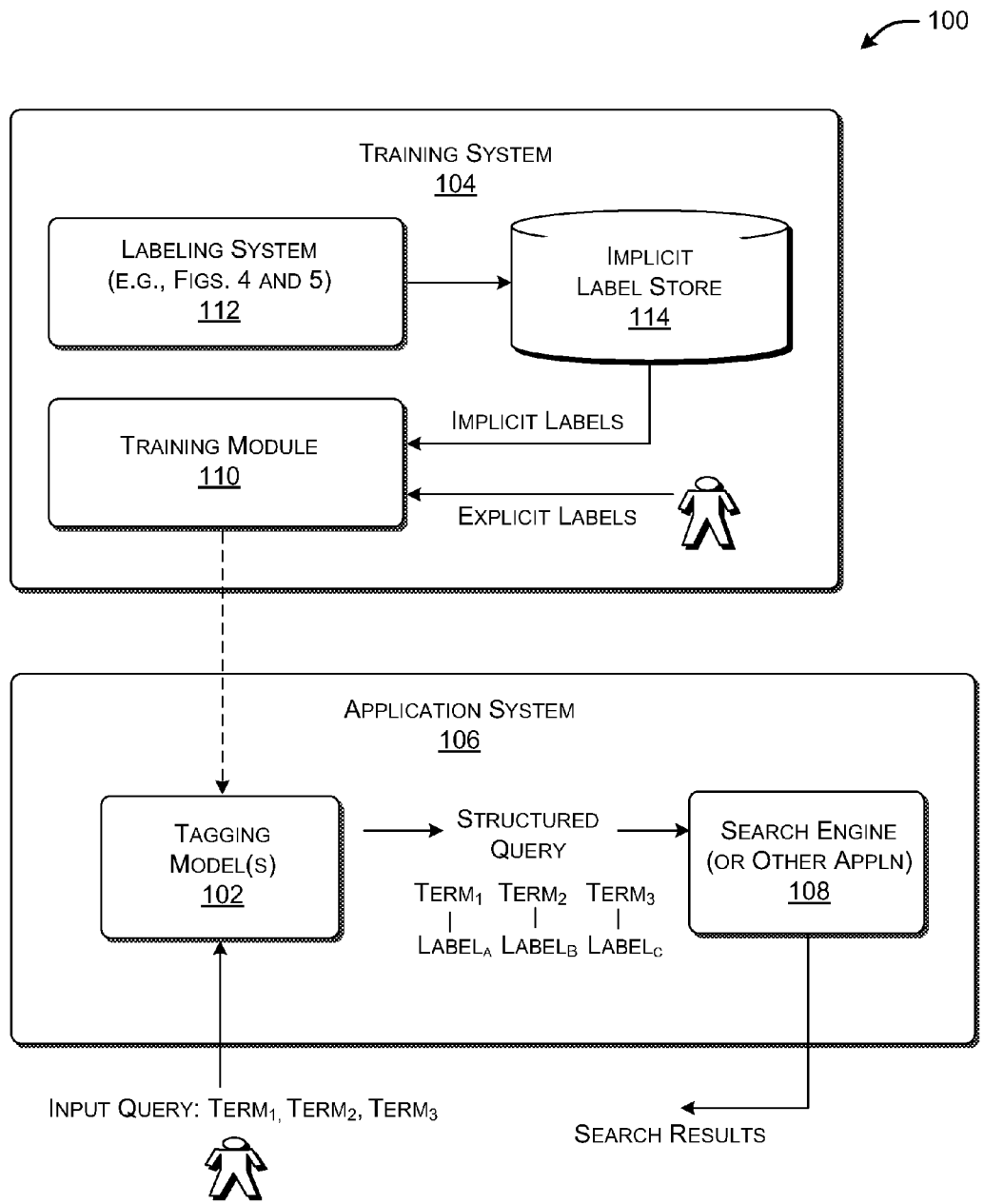
FIG. 1 shows an illustrative environment in which a tagging model is generated and applied.

FIG. 1 shows one environment 100 in which a tagging model 102 can be trained and then applied. That is, a training system 104 is used to train the tagging model 102, e.g., by generating model parameters Λ which describe the model. The training system 104 operates in a training phase of the environment 100. An application system 106 applies the tagging model 102 after it has been trained. The application system 106 operates in an application phase of the environment 100.

The description below sets forth the operation of the environment 100 in a search-related context. In this context, the application system 106 assigns labels to queries. However, aspects of the principles described herein can be applied to other environments. For example, in another environment, the application system 106, can apply descriptive labels to documents or document parts. In another environment, the application system 106 can apply part-of-speech labels to sentences. In another environment, the application system 106 can apply biological labels to biological data, and so on. No limitation is placed on the application of the principles described herein.

As to the application phase of the environment, the tagging model 102 operates by applying labels to tokens within an input sequence. In the illustrative search-related context of FIG. 1, the tagging model 102 applies labels to query terms. The labels identify descriptive fields associated with the terms. For example, assume that a user inputs a query having $term_1$, $term_2$, and $term_3$. The tagging model 102 may apply $label_A$ to $term_1$, $label_B$ to $term_2$, and $label_C$ to $term_3$. By annotating the input query with labels, the tagging model 102 transforms the query into a structured query.

A search engine 108 (or other application) provides search results based on a structured query provided by the tagging model 102. For example, the search results may correspond to documents or other information which match the structured query. The structured form of the query may render the query more effective in retrieving desirable information. This is because the labels provide additional descriptive information that helps disambiguate the query, allowing the search engine 108 to more effectively generate desirable search results. The search engine 108 can provide particularly effective results in those cases in which it conducts a search within one or more structured databases. A structured database provides a repository of information which is organized according to some structure, where the structure may be associated with respective fields.

In one approach, the tagging model 102 can correspond to a conditional random field (CRF) type of tagging model. In a yet more particular implementation, the tagging model 102 can correspond to a linear chain-type CRF tagging model. A CRF model is a probabilistic model for assigning a sequence of labels to a sequence of empirical observations. More formally, in a query-related context, the CRF model operates by accepting an input query x having T query terms, that is, $x=(x_1, x_2, \ldots x_T)$. The CRF model assigns T labels to a sequence of state variables associated with the input query. The labeled state variables may be represented as $y=(y_1, y_2, \ldots y_T)$. In general, each state variable can assume a categorical value selected from a permissible set of categorical values. A conditional probability $p(y|x)$ of the CRF model represents the probability of a given state sequence y given a particular input sequence x. Section A.3 (below) provides additional information regarding CRF models.

In one case, the environment 100 provides a single tagging model 102 that can be used to apply labels to any type of query in any type of domain. In other words, the tagging model 102 may represent a domain-independent tagging model. In another case, the environment 100 can provide two or more tagging models that are specialized to provide labels for queries within different respective domains. For example, assume that a user inputs a query that pertains to a book-related search. The application system 106 can invoke a first type of tagging model associated with book-related queries. Next assume that the user inputs a query that pertains to a news-related search. The application system 106 can invoke a second type of tagging model associated with news-related queries. No limitation is placed on the number of tagging models that can be used.

The application system 106 can use any consideration to determine which tagging model applies to a particular input query (that is, in the implementation in which the application system 106 provides multiple tagging models). In one case, the application system 106 can examine the nature of the query itself to determine what type of domain it pertains to (e.g., based on keywords in the query). Alternatively, or in addition, the application system 106 can identify the domain associated with a query based on the context in which the user is performing a search. For example, if the user visits a network-accessible provider of music, then the application system 106 may invoke a tagging model which pertains to music-related merchandise. Still other considerations may be used to determine what type of tagging model 102 to apply.

Now advancing to the training system 104, the training system 104 generates the tagging model 102 (which is described in the singular below for brevity). More specifically, the training system 104 includes a training module 110. The training module 110 generates model parameters $\Lambda = \{\lambda_k\}$ which collectively define the tagging model 102. It performs this task by iteratively attempting to maximize a training objective.

By way of overview, the training module 110 operates by generating the model parameters $\Lambda$ based on a training set of labeled data. More specifically, the training module 110 generates the tagging model 102 based on a combination of an explicitly-labeled training set and an implicitly-labeled training set. The explicitly-labeled training set provides explicit labels that have been manually defined by human analysts for a set of queries. That is, the explicitly-labeled training set provides explicit labels that are generated in a supervised manner. The implicitly-labeled training set provides implicit labels that have been automatically (or semi-automatically) generated for another set of queries. That is, the implicitly-labeled training set provides implicit labels that are generated in an unsupervised manner or at least a partially unsupervised manner.

The training module 110 can treat the implicit labels in different ways depending on different modes of operation. In a hard evidence approach, the training module 110 can treat the implicit labels as equivalent to manually-annotated labels. In this approach, the implicit labels dictate (fix) the values of variables in the state sequence. In a soft evidence approach, the training module 110 can treat the implicit labels as non-binding suggestions pertaining to the values of the variables in the state sequence (which are all treated as hidden), e.g., without necessarily fixing those values. Section A.3 (below) provides additional information regarding the manner in which the training module 110 may operate.

A labeling system 112 is used to generate the implicitly-labeled training set. By way of overview, the labeling system 112 can operate by associating queries with items that have been selected by users. For example, the items may correspond to network-accessible page selections made by users after inputting the queries. The labeling system 112 can then use the items to identify schema information provided in one or more descriptive stores. The labeling system 112 can then use the schema information to identify implicit labels $z_i$ that may be assigned to the queries. The labeling system 112 can store the implicit labels in an implicit label store 114. Section A.2 (below) explains the labeling system 112 in greater detail.

Advancing to FIG. 2, this figure shows a table that provides a list of nine fields. The tagging model 102 and training module 110 select from among these fields when assigning labels to query terms. The fields shown in FIG. 2 collectively correspond to schema information for labeling queries, as defined by a target schema associated with one particular domain.

In the merely illustrative case of FIG. 2, the domain pertains to product-related searches. In this context, a first set 202 of fields correspond to attributes pertaining to products themselves. A second set 204 of fields correspond to collateral issues pertaining to a user's search for a product. Other target schemas may be appropriate for other respective domains in which searches may be conducted. For example, a first target schema may be appropriate for book-related queries, while a second target schema may be appropriate for electronics-related queries.

As to the product-related fields, a first field in the table is used to indicate that a query term is directed to brand-related information, as in "Acme" in the hypothetical query "Acme Powershot Z250." A second field indicates that a query term is directed to model-related information, as in "Powershot Z250" in the hypothetical query "Acme Powershot Z250." A third field indicates that a query term is directed to type-related information, as in "Digital Camera" in the hypothetical query "Acme Digital Camera Silver." A fourth field indicates that a query term is directed to attribute-related information, as in "Silver" in the hypothetical query "Acme Digital Camera Silver."

As to the collateral fields, a fifth field indicates that a query term is directed to merchant-related information, as in "Best Buy" in the hypothetical query "Digital Cameras at Best Buy." A sixth field ("SortOrder") indicates that a query term is directed to ranking-related information, as in as in "Best" in the hypothetical query "Best Digital Cameras." A seventh field ("BuyingIntent") corresponds to information which has a bearing on the user's purchase-related intent, as in "Buy" in the hypothetical query "Buy Acme Digital Camera." An eighth field ("ResearchIntent") indicates that a query term is directed to information which has a bearing on the user's research-related intent in performing a search, as in "Review" in the hypothetical query "Digital Cameras Review." A ninth field corresponds to other categorizations of a query term. The list of nine fields is representative of one particular target schema; as stated, other search domains may apply other target schemas.

FIG. 3 shows one implementation of the environment 100 of FIG. 1 that uses computing functionality. More specifically, the dashed box indicates that the computing functionality of the environment 100 can be distributed between local computing functionality 302 and remote computing functionality 304 in any manner. The local computing functionality 302 is coupled to the remote computing functionality 304 by a network 306.

For example, in one case, the training system 104 and the application system 106 are entirely implemented by the local computing functionality 302. In another case, the training system 104 and the application system 106 are entirely implemented by the remote computing functionality 304 (except that a user may use a local device to access the remote computing functionality 304). In another case, the training system 104 and the application system 106 are distributed between the local computing functionality 302 and the remote computing functionality 304 in any manner.

To cite a few examples, in one case, the tagging model 102 is implemented on a user's local computing device. The tagging model 102 can add labels to a query before that query is submitted to a local or remote search engine. In another case, the tagging model 102 is implemented by a remote network-accessible engine. In another case, both local and remote computing functionality can serve a role in adding labels to a query. Similarly, the training system 104 can be provided at any location or combination of locations.

The local computing functionality 302 can correspond to any type of functionality for performing the above-described functions, such as a personal desktop computing device, a laptop computing device, a personal digital assistant (PDA) type computing device, a stylus-type computing device, a mobile phone type computing device, a game console device, and so on. The remote computing functionality 304 can represent any type of remote processing infrastructure, such as one or more server-type computing devices in cooperation with one or more data stores (and potentially other types of data processing equipment). The resources of the remote computing functionality 304 can be provided at a single location or can be distributed over plural locations. The network 306 can represent a local area network, a wide area network (e.g., the Internet), or some combination thereof. The network 306 can be governed by any protocol or combination of protocols.

A.2. Labeling System

Figure 4:
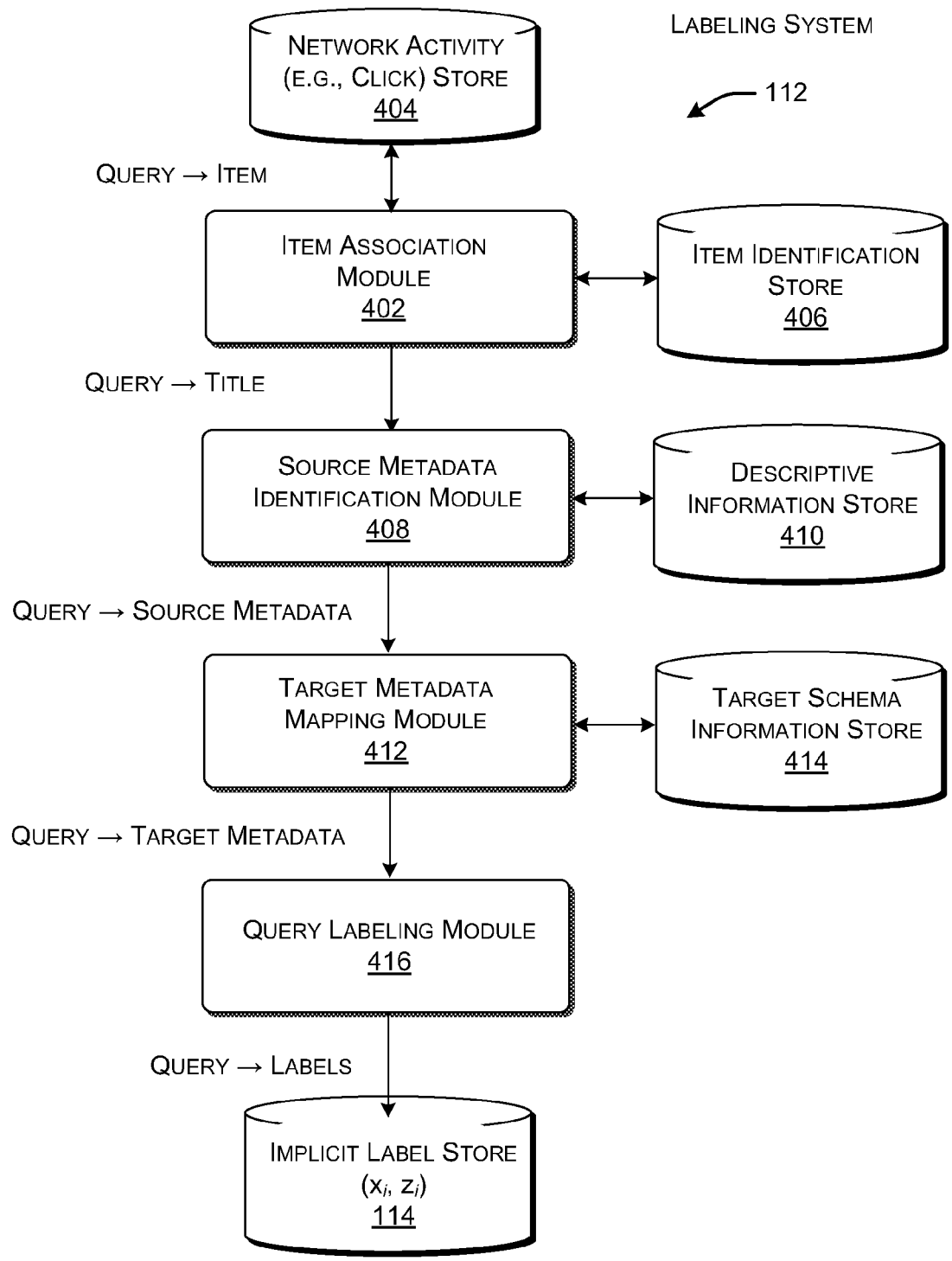
FIG. 4 shows an illustrative labeling system for generating implicit labels for use in training a tagging model.

FIG. 4 shows one implementation of the labeling system 112 introduced in the context of FIG. 1. The labeling system 112 assigns labels to queries. The labels are selected from a target schema, such as, but not limited to, the target schema shown in FIG. 2. FIG. 5 shows an illustrative application of the labeling system 112 of FIG. 4. FIGS. 4 will be explained by making reference to the example of FIG. 5.

The labeling system 112 may operate in an automated manner. In this case, the labeling system 112 may operate without human supervision. In another case, the labeling system 112 operates in a semi-automated manner. In this case, the labeling system 112 may operate in a partially unsupervised manner. For example, an analyst may contribute some guidance to the labeling operation performed by the labeling system 112.

In general, the labeling system 112 operates by making reference to supplemental information provided by one or more supplemental sources. The supplemental information is considered supplemental because it provides information beyond that provided by the queries themselves. The labeling system 112 uses the supplemental information to assign labels to queries. In the illustrative case of FIG. 4, the supplemental information may correspond to click data provided by a search engine and metadata provided by one or more product databases or the like. But in other environments, the labeling system 112 can rely on other types of supplemental information.

To begin with, an item association module 402 associates queries with items. In one case, the items correspond to network-accessible pages selected by users after the users have entered queries. For example, as shown in FIG. 5, assume that a user inputs the query "Cheap Acme Streetsmart 2820 GPS," upon which a search engine provides the user with search results. Then assume that, after viewing the search results, the user selects a page associated with a GPS receiver device, named Streetsmart 2820, provided by a manufacturer named Acme. In this case, the item association module 402 associates the query with the page selection made by the user.

The item association module 402 can provide the above-described association by making reference to a network activity store 404. In one case, the network activity store 404 may correspond to a click log maintained by a search engine or other entity. The network activity store 404 may maintain information which associates queries and selected pages, sometimes referred to as click data or the like.

The item association module 402 may consult an item identification store 406 to cull a specific subset of click data from the network activity store 404. For example, assume that a tagging model is being developed to label queries associated with a particular domain, such as electronic equipment. In this case, item association module 402 may access a particular identification store that provides a list of pages associated with electronic equipment. In one case, for example, the item identification store 406 may be provided by a manufacturer or retailer, etc. In this case, the item identification store 406 identifies the products provided by the manufacturer or retailer. The item association module 402 can then selectively identify the queries in the network activity store 404 for which users subsequently clicked on any of the items identified in the item identification store 406.

In another implementation, an entity may maintain click data within a specific domain. For example, a merchant may maintain click data regarding queries submitted to its network-accessible service, along with corresponding page selections made by users after submitting the queries. In this case, the item association module 402 can associate queries with selected items by retrieving click data from this specialized data store, e.g., without having to cull a subset of queries from a more general repository of click data (associated with the network activity store 404).

Next, the item association module 402 can extract information from the items. For example, the item association module 402 can extract titles associated with the items. In one case, the items correspond to network-accessible pages represented in a markup language (such as HTML). In that case, the item association module 402 can extract the titles from the pages by extracting appropriately-tagged title information from the pages. In the example of FIG. 5, assume that the item association module 402 extracts a title "Acme Streetsmart 2820" from a page accessed by a user after the user enters the query identified above. Hence, as a result of its processing, the item association module 402 generates an output which links queries with titles (or some other item-identifying information).

Next, a source metadata identification module 408 uses the extracted information (e.g., the titles) to retrieve schema information from a descriptive information store 410. For example, assume that the descriptive information store 410 corresponds to a database that maintains descriptive information regarding items (e.g., products). Further assume that the descriptive information describes the items in a structured manner using a source schema. For example, the descriptive information may describe the items using a set of metadata fields that constitutes the source schema. In this case, the source metadata identification module 408 can use the identified title of the item to determine similar title information that appears in the descriptive information store 410. This operation can be performed using any matching mechanism, such as a cosine similarity matching mechanism, etc. The source metadata identification module 408 can then extract whatever metadata is associated with the title information within the descriptive information store 410. The extracted metadata constitutes schema information expressed in the source schema. As a result of the processing performed by the source metadata identification module 408, the labeling system 112 correlates a query with schema information expressed in the source schema.

For example, FIG. 5 shows that the title "Acme Streetsmart 2820" is used to identify similar title information in the descriptive information store 410. The title information, in turn, is associated with other descriptive information. In this example, the descriptive information includes three pieces of information demarcated by three respective metadata fields. A "Manufacturer" field identifies the manufacturer of the item as "Acme." A "Model" field identifies the model of the item as "Streetsmart 2820." A "Device Type" field identifies the type of device associated with the item as a GPS receiver.

Next, a target metadata mapping module 412 maps the schema information from the source schema to a target schema. The source schema identifies the fields used to organized descriptive information in the descriptive information store 410, while the target schema identifies the fields that will be used to label queries. For example, the target schema may correspond to the nine fields identified in FIG. 2. The target metadata mapping module 412 operates by converting fields in the source schema to fields in the target schema. To this end, the target metadata mapping module 412 can consult target metadata information and/or mapping rules provided in a target schema information store 414. In an alternative case, the schema information provided by the source metadata identification module 408 is already in the target schema. Here, the labeling system 112 can omit the operations performed by the target metadata mapping module 412.

FIG. 5 shows an example in which the target schema includes, in part, three fields, corresponding to "Brand," "Model," and "Type." The target metadata mapping module 412 maps the field "Manufacturer" in the source schema to the field "Brand" in the target schema. It maps the field "Model" in the source schema to the same field "Model" in the target schema. And it maps the field "Device Type" in the source schema to the field "Type" in the target schema. In general, multiple fields in a source schema may map to a single field in the target schema. As a result of the processing performed by the target metadata mapping module 412, the labeling system 112 correlates a query with schema information expressed in a target schema.

Next, a query labeling module 416 uses the above-identified schema information to apply labels to the queries based on various rules. In one merely illustrative case, the query labeling module 416 can apply a label to a query term if the query term maps to a single label. For example, as shown in FIG. 5, the query labeling module 416 assigns the label "Brand" to the query term "Acme," "Model to "Streetsmart," "Model" to "2820," and "Type" to "GPS." This is because each of these query terms maps to a single respective label. The query labeling module 416 assigns a label of "null" to any query term that fails to map to any label, or which maps to more than one label. For example, the query labeling module 416 assigns the label of "null" to the query term "Cheap" because this term did not map to any label.

The result of the processing shown in FIG. 4 is an implicitly-labeled training set. The labeling system 112 may store the implicitly-labeled training set in the implicit label store 114.

A.3. Training Module

A.3.1. Overview of Illustrative Training Approaches

Figure 6:
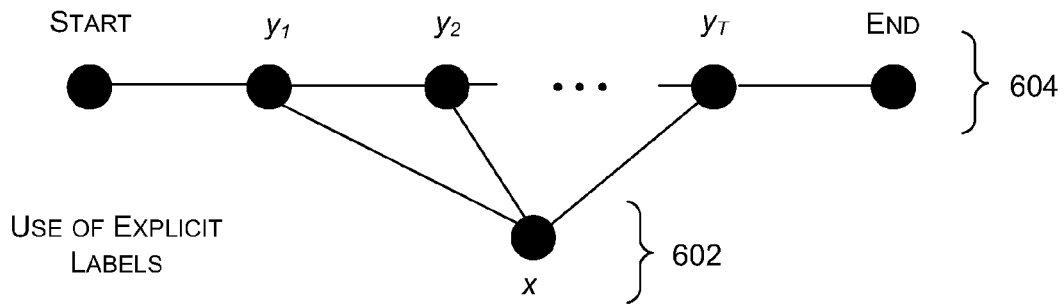
FIG. 6 shows a graph associated with a fully supervised training scenario.
Figure 7:
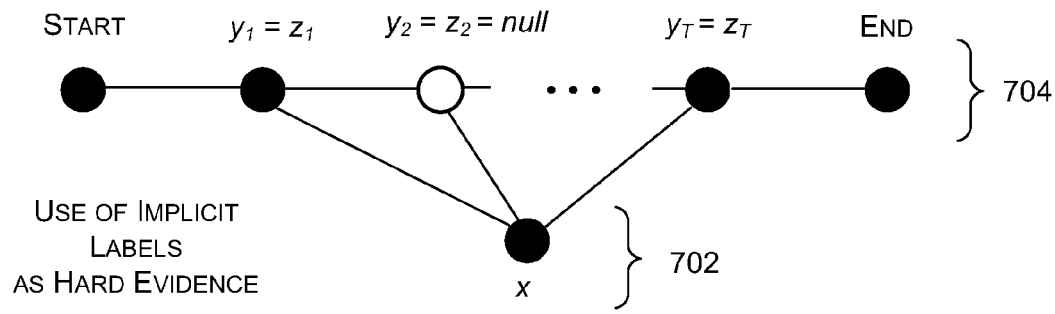
FIG. 7 shows a graph associated with the use of implicit labels as hard evidence.
Figure 8:
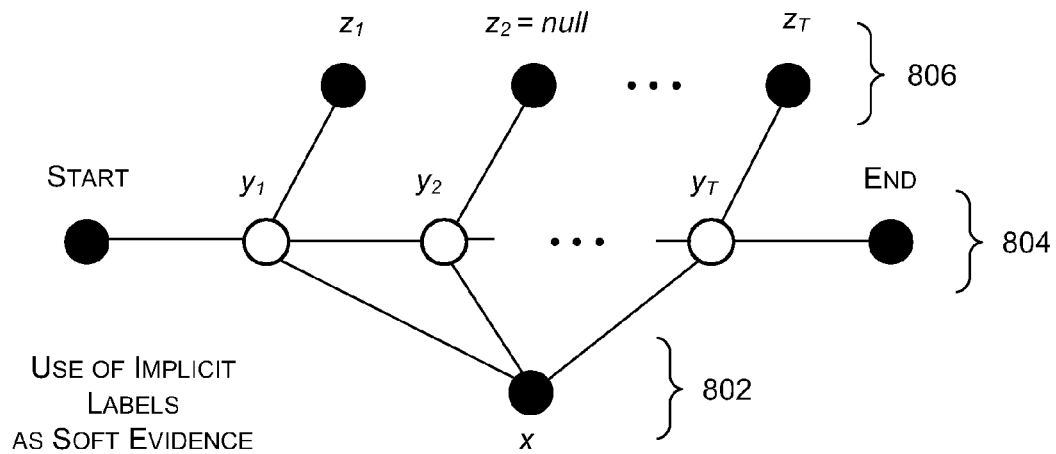
FIG. 8 shows a graph associated with the use of implicit labels as soft evidence.

The training module 110 uses the explicitly-labeled training set (defined by human annotation) and the implicitly-labeled training set (defined by the labeling system 112 in unsupervised manner) to generate the tagging model 102. As summarized above in Section A.1, the training module 110 can use different approaches to generate the tagging model 102. FIGS. 6, 7, and 8 represent explanatory graphs associated with three respective approaches.

FIG. 6 illustrates, for frame of reference, a traditional approach for training a CRF model based solely on an explicitly-labeled training set. Namely, an input sequence x defines an input query, associated with node 602. A sequence of manually-selected labels, $y=(y_1, y_2, \ldots y_T)$, are assigned to state variable nodes 604. In this example, each state variable node receives a label, so there are no missing labels in the state sequence.

It is not always practical to train a tagging model using a large amount of manually-labeled data, particularly in the environment of query tagging. To address this issue, the training module 110 described herein can train a CRF tagging model based on a combination of explicit labels (e.g., $y=(y_1, y_2, \ldots y_T)$) and implicit labels (e.g., $z=(z_1, z_2, \ldots z_T)$). Implicit labels represent a valuable resource in a training operation because they offer information, often in a large amount, complementary to that provided by explicit labels. In one case, explicit labels are available for only a subset of word tokens. In the following, $z_T$=null represents an implicit label that is missing (e.g., because the labeling system 112 could not apply a label to a query term under consideration).

Implicit labels can be applied in the training operation in two different ways: as hard evidence and as soft evidence. FIG. 7 shows a case in which the training proceeds by treating the implicit labels as hard evidence. An input sequence x defines an input query, associated with node 702. A sequence of implicit labels, $z=(z_1, z_2, \ldots z_T)$, is directly assigned to the state variable nodes 704, e.g., as if the implicit labels were explicit labels. In this case, there may be one or more query terms that lack implicit labels. For example, the second state variable node lacks a label, and is therefore assigned the default label of "null."

In the above-described hard evidence approach, the training module 110 uses the implicit labels to fix the values for the state variables. However, there is a risk that some implicit labels may have erroneous values, e.g., because the labeling system 112 has assigned the wrong labels to some of the state variables. This possibility, in turn, may affect the quality of the tagging model 102 produced in the training operation.

To address this situation, the training module 110 can alternatively treat the implicit labels as soft evidence. FIG. 8 shows a case in which the training proceeds by treating the implicit labels as soft evidence. The input sequence x defines an input query, associated with node 802. Here, all of the state variable nodes 804 are treated as unknown. Further, the implicit labels are treated as soft evidence that is associated with a series of evidence nodes 806. The evidence nodes 806, in turn, are linked to the respective state variable nodes 804. Through this relationship, the implicit labels provide non-binding suggestions regarding the values of the state variables, but do not necessarily dictate (e.g., rigidly fix) those values.

The following explanation provides additional details regarding the hard evidence approach of FIG. 7 (in which implicit labels are treated as hard evidence) and the soft evidence approach of FIG. 8 (in which implicit labels are treated as soft evidence). Before that description, additional details are provided regarding conditional random field (CRF) models in general.

A.3.2. General Characteristics of CFR Models

In an application mode, a CRF model operates by accepting an input query x having T query terms, that is, $x=(x_1, x_2, \ldots x_T)$. The CRF model assigns a state (field) sequence y having T labels, that is, $y=(y_1, y_2, \ldots y_T)$. In general, each $y_T$ can assume a categorical value from a set of pre-defined values. Further, the state sequence can include two special states: Start and End, represented by $y_0$ and $y_{T+1}$, respectively.

The state Start represents the start of the sequence, and the state End represents the end of the sequence. For instance, FIGS. 6-8 show state sequences which are delimited by Start and End states.

A conditional probability p(y|x) represents the probability of a given output sequence y given a particular input sequence x. The conditional probability can be represented by:

$$p(y \mid x; \Lambda) = \frac{1}{Z(x; \Lambda)} \exp\left\{\sum_k \lambda_k \sum_{t=1}^{T+1} f_k(y_{t-1}, y_t, x, t)\right\}. \quad (1)$$

Here, $f_k(y_{t-1}, y_t, x)$ refer to feature functions. The feature functions represent characteristics (or features) of the data being modeled. $\Lambda = \{\lambda k\}$ refer to corresponding weight parameters applied to the feature functions. $Z(x; \Lambda)$ corresponds to a partition function that normalizes the exponential form of the above expression to correspond to a probability distribution.

Typically, there are two types of features used in first-order, linear-chain CRFs: transition features and emission features (also referred to as state features). A transition feature is a binary function that indicates whether a transition ($y_{t-1}=i$, $y_t=j$) occurs, e.g., $$f_{i,j}^{TR}(y_{t-1}, y_t, x, t) = \delta(y_{t-1}=i)\delta(y_t=j) \quad (2).$$

An emission feature is a binary function that indicates whether an observation-dependent feature co-occurs with state j. For example, a unigram feature function can be described as:

$$f_{w,j}^{UG}(y_{t-1}, y_t, x, t) = \delta(x_t=w)\delta(y_t=j) \quad (3).$$

Here, w represents a unigram. In a more general form, $\delta(x_t=w)$ can be replaced with an arbitrary function on x. Different forms of this function can express different characteristics of the input query.

In one case, the tagging model is produced in a training operation based solely on a set of manually-labeled queries $\{(x_i, y_i)\}_{i=1}^m$. In other words, these labels correspond to explicit labels as described above. In one example, the training operation can generate the tagging model by finding the model parameters that maximize the conditional likelihood of the training data while regularizing model parameters:

$$J_1 = \sum_{i=1}^m \log p(y_i \mid x_i; \Lambda) - \frac{1}{2\sigma^2}\|\Lambda\|^2. \quad (4)$$

This training objective can be optimized using stochastic gradient descent, generalized iterative scaling, or other numerical optimization methods. As mentioned, FIG. 6 graphically represents the training of a CRF model based on an explicitly-labeled training set.

A.3.3. General Considerations Regarding the Application of CRF Models to Query Tagging When applying CRF models to query tagging, and, in particular, product search query tagging, it is observed that the distribution of transition features may be skewed in this dataset. For example, ($y_{t-1}$=Type, $y_t$=End) may occur in a significant percentage of the queries, meaning that most queries in this dataset end with the field Type. This, in turn, validates that CRF models may be more effective than, for example, maximum entropy (MaxEnt) models in tagging search queries. CRF models assume a probabilistic dependency between two consecutive states, whereas MaxEnt classifiers tag each word token independently.

In addition to transition features that are implicitly assumed by CRF models, a tagging model can include additional types of emissions features. First, the tagging model can use ngram features including both unigrams and bigrams. A unigram feature has been described in Equation (3). A bigram feature can be described in a similar way. For example, for a given state variable in the linear chain, the model can use the current word and its preceding word to form a bigram, e.g., $$f_{w,w',j}^{BG}(y_{t-1}, y_t, x, t) = \delta(x_{t-1}=w)\delta(x_t=w')\delta(y_t=j) \quad (5).$$

The tagging model can also use a bigram that consists of the current word and its following word or use both types of bigrams simultaneously. However, in some applications, these alternatives may not provide a significant difference in performance. The use of bigrams offers contextual information that is helpful in word disambiguation. Consider the examples in FIG. 2. The word "buy" is often properly assigned the field "BuyingIntent" because it reflects a user's intent to purchase an item. But when "buy" is used in the context of "Best Buy," or the like, the word most likely refers to the field "Merchant." When used in a CRF model, each ngram feature is assigned a separate weighting parameter, providing fine-grained information for sequential labeling.

To improve the generalization, the tagging model can also incorporate a second type of feature referred to as a regular expression ("regex") feature:

$$f_{r,j}^{REGEX}(y_{t-1}, y_t, x, t) = \delta(x_t \sim r)\delta(y_t=j) \quad (6).$$

Here, $x_t \sim t$ means that $x_t$ matches a regular expression r. For example, the query terms sd700, sd800 and sd850 all match the regular expression "[a-z]+[0-9]+" (in a pattern matching language). This feature can therefore be useful in representing word tokens that correspond to fields such as "Model" and "Attribute."

Third, the tagging model can also incorporate lexicon features which are given by:

$$f_{L,j}^{LEX}(y_{t-1}, x, t) = \delta(x_t \in L)\delta(y_t=j) \quad (7).$$

Here, L denotes a lexicon of words or phrases. This feature is activated if $x_t$ occurs in that lexicon. Field-dependent lexicons, e.g., a Brand lexicon, can be extracted from a product database, enumerating possible values for each field. The advantage of using such features is that they generalize to words that do not occur in the training data.

A.3.4. Training CRF Models Using Implicit Labels: the Case of Implicit Labels as Hard Evidence This subsection describes the hard evidence approach of training the tagging model, while the next section describes the soft evidence approach. For both cases, the training operation assumes the availability of two data sources: (1) a set of manually-labeled samples, denoted by $\{(x_i, y_i)\}_{i=1}^m$, and (2) a set of samples with implicit labels, denoted by $\{(x_i, z_i)\}_{i=m+1}^{m+n}$. In both cases, the training module 110 attempts to learn a CRF model based on the explicit labels and implicit labels.

In the hard evidence approach, for queries in the second data source, the approach assumes that a state variable is observed with value $y_t=z_t$, if $z_t \neq$ null, and is hidden otherwise. This training setting is depicted in the graphical model in FIG. 7, described above.

To train such a model, the training module 110 can again apply a maximum likelihood approach. Let $y_i^o$ denote the set of observed state variables, and $y_i^h$ denote the complementary set of state variables that are hidden. In the case of hard evidence, the goal is to maximize the conditional likelihood of the incomplete data, that is, $\log p(y^o|x) = \log \Sigma_{y^h} p(y^o, y^h, y^h|x)$. The conditional likelihood in this case cannot be directly optimized. However, in one approach, the training module 110 can apply the expectation-maximization (EM) algorithm to iteratively maximize its lower bound. More specifically, the training objective is given by:

$$j_1 + \sum_{i=m+1}^{m+n} E_{p(y_i^h|x_i, y_i^o; \Lambda^g)}[\log p(y_i | x_i; \Lambda)]. \quad (8)$$

The term is $j_1$ is given in Equation (4); it corresponds to the conditional likelihood of manually-labeled data. The second term denotes the expected conditional likelihood of implicitly-labeled data. This is akin to the optimization objective of hidden-state CRFs. In the second part of the equation, $p(y_i|x_i; \Lambda)$ is given by Equation (1).

More formally, the training module 110 can apply the EM algorithm as follows. In the E-step, the training module 110 can compute the posterior probability $p(y_i^h|x_i, y_i^o; \Lambda^g)$ based on the current model parameters $\Lambda^g$. This can be efficiently computed, for example, using the Forward-Backward algorithm. In both the forward and backward paths, the values of the observed state variables are committed to their implicit labels. In the M-step, the training module 110 can re-estimate $\Lambda$ so as to maximize Equation (8). In other words, the training module 110 can fix the posteriors and update model parameters to maximize Equation (8). This step can be solved, for example, using stochastic gradient descent. The gradient has a similar form as that of $j_1$ except for an additional marginalization over $y^h$. The E and M steps of the EM algorithm are repeated until a stopping criterion is satisfied. Since queries are typically short, computation is generally not an impediment to exact inference. In one example, the training module 110 can provide satisfactory results for a few epochs of the EM algorithm, e.g., 2-3 iterations.

According to one implementation issue, the semi-supervised training objective is no longer convex due to the existence of hidden variables. Learning performance is therefore dependent on the initialization of model parameters. In one approach, the CRF model can be initialized by performing supervised learning on manually-labeled training data, but the training module 110 extracts emission features from both explicit and implicit data sources.

The training module 110 can apply other algorithms to train the CRF model, such as the Viterbi algorithm. In a first step of this approach, the training module 110 computes $y_i^{h*} = \arg\max p(y_i^h|x_i, y_i^o \Lambda^g)$ for all queries in the second data source using the current model $\Lambda^g$. In a second step, the training module re-estimates $\Lambda$ so as to maximize $j_1 + \Sigma_{i=m+1}^{m+n} \log p(y_i^{h*}, y^o|x_i; \Lambda)$, replacing the sum in Equation (8) with a maximum function. The training module 110 repeats these two steps until a stopping criterion is reached.

A.3.5. Training CRF Models Using Implicit Labels: the Case of Implicit Labels as Soft Evidence As described above, in the soft evidence approach, the training module 110 treats the entire state sequence as hidden variables, but uses implicit labels to provide extra evidence in inference. This is achieved by creating a sequence of soft evidence nodes $z_t$, $t=1, 2, \ldots, T$, in parallel to the hidden state nodes $y_t$. FIG. 8, as described above, shows a graphical model which represents this training configuration.

To train such a model, the training module 110 can again apply a maximum likelihood approach. However, since all state variables are hidden, the learning objective in Equation (8) is no longer applicable. Instead, the training algorithm can apply the optimization objective $\log p(z|x) = \log \Sigma_y p(y, z|x)$. More formally, the training module can be applied to iteratively optimize the following expected conditional likelihood:

$$J_1 + \sum_{i=m+1}^{m+n} E_{p(y_i|x_i, z_i; \Lambda^g)}[\log p(y_i, z_i | x_i; \Lambda)]. \quad (9)$$

For the purposes of training, a conditional probability $p(y, z|x; \Lambda)$ in the second part of the Equation (9) can be defined as:

$$\frac{1}{Z'(x; \Lambda)} \exp\left\{\sum_k \lambda_k \sum_{t=1}^{T+1} f_k(y_{t-1}, y_t, x) + \omega \sum_{t=1}^{T} s(y_t, z_t)\right\}. \quad (10)$$

Here, $Z'(x; \Lambda)$ is a normalization function (obtained by summing the numerator over both y and z). The feature $s(y_t, z_t)$ is a soft evidence feature function with a weighting parameter $\omega$. In one case the parameter $\omega$ can be manually selected. In another case, the parameter $\omega$ can be automatically estimated in the same fashion as, for example, $\lambda_k$ are estimated. The first approach incorporates human knowledge about the importance of implicit labels. In general, the information provided by the implicit labels is thus incorporated in the model via the $s(y_t, z_t)$ feature function. In one illustrative case, to use $z_t$ as a "prior" of $y_t$, it is desired that $s(y_t=z_t, z_t) > s(y_t \neq z_t, z_t)$ if $z_t \neq$ null. In one implementation, the training module 110 can choose the following function form, $$s(y_t, z_t) = \begin{cases} 0 & \text{if } z_t = \text{null} \\ 1 & \text{else if } y_t = z_t \\ -1 & \text{else.} \end{cases} \quad (10)$$

Note that the soft evidence feature is only used in training. Once trained, the tagging model uses Equation (1) to predict the state sequences for unseen queries in an application phase of operation.

To understand the impact of the soft evidence feature on $p(y|x, z; \Lambda^g)$, and hence on training, it is possible to rewrite the posterior probability using the Bayes rule:

$$p(y | x, z; \Lambda^g) = \frac{p(y, z | x; \Lambda^g)}{\sum_y p(y, z | x; \Lambda^g)}. \quad (11)$$

It can be seen that $p(y|x, z; \Lambda^g)$ has the same exponential form as Equation (10) except that it has a different normalization function. This means that if $x_t$ does not have an implicit label, that is, if $z_t$=null, the soft evidence function assigns equal values (zero) to all state hypotheses, in which case the posterior probability solely depends on transition and emission features $f_k$. Further, when there does exist an implicit label, the function assigns a relatively large value to the state hypothesis that agrees with the implicit label. In other words, the soft evidence function regularizes a hidden state towards the value of the corresponding implicit label. The larger the weighting parameter $\omega$, the more influence this feature has on the posterior probability. At one extreme, where $\omega=0$, the implicit label information is completely ignored in training. At the other extreme, where $\omega\to\infty$, all state hypotheses have very small posterior probabilities except the one consistent with the implicit label; this scenario therefore is equivalent to using implicit labels as hard evidence.

More formally stated, the training module 110 can generate the tagging model using the EM algorithm in the following manner. In the E step, the training module 110 computes $p(y_i|x_i, z_i, \Lambda^g)$ for all queries in the second data source using the current model $\Lambda^g$. In the M step, the training module 110 can re-estimate $\Lambda$ that maximizes Equation (9). The training module 110 repeats the above-described E and M steps until a stopping criterion is satisfied.

The training module 110 can apply other algorithms to train the CRF model, such as the Viterbi algorithm. In a first step of this approach, the training module 110 computes $y^*=\text{argmax } p(y|x, z, \Lambda^g)$ for all queries in the second data source using the current model $\Lambda^g$. In the second step, the training module 110 re-estimate $\Lambda$ that maximizes $j_1+\Sigma_{i=m+1}^{m+n} \log p(y_i, z_i|x_i; \Lambda)$, replacing the sum with the maximum in equation (9). The training module 110 repeats these two steps until a stopping criterion is satisfied.

B. Illustrative Processes

FIGS. 9-12 show procedures that explain the operation of the environment 100 of FIG. 1 in flowchart form. Since the principles underlying the operation of the environment 100 have already been described in Section A, certain operations will be addressed in summary fashion in this section.

Figure 9:
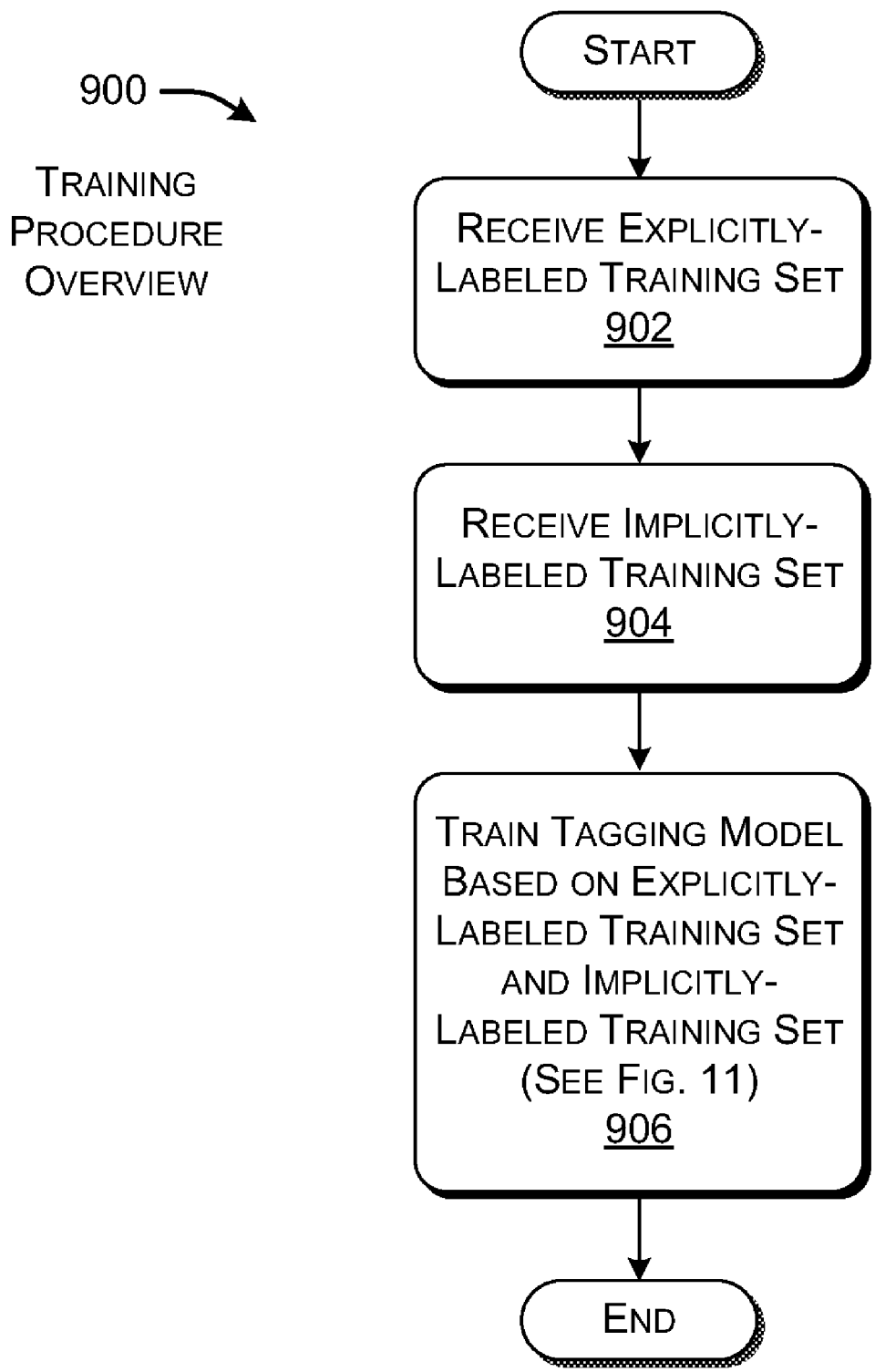
FIG. 9 shows an illustrative procedure which describes an overview of a training operation.

Starting with FIG. 9, this figure shows a procedure 900 that presents an overview of the training operation performed by the training system 104.

In block 902, the training module 110 accepts an explicitly-labeled training set.

In block 904, the training module 110 accepts an implicitly-labeled training set.

In block 906, the training module 110 uses both the explicitly-labeled training set and the implicitly-labeled training set to train the tagging model 102. As described above, the training module 110 can rely on a hard evidence approach to perform this task, a soft evidence approach, or some other approach.

Figure 10:
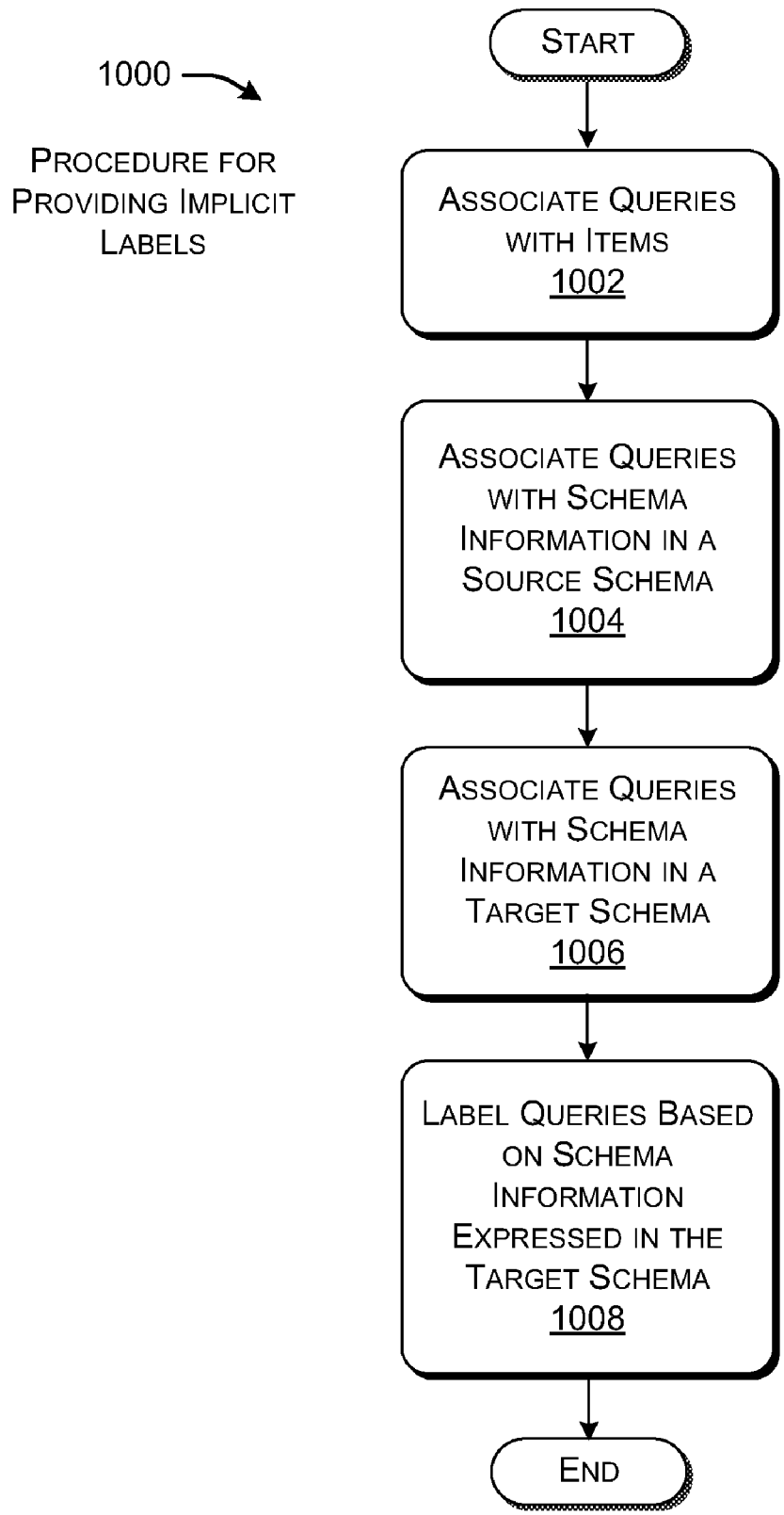
FIG. 10 shows an illustrative procedure for generating implicit labels.

FIG. 10 shows a procedure 1000 for generating an implicitly-labeled training set. The labeling system 112 of FIG. 1 may perform this procedure 1000.

In block 1002, the labeling system 112 associates queries with items. The items may correspond to network-accessible pages that users have selected after entering queries. The labeling system 112 may rely on the network activity store 404 (e.g., a click store provided by a search engine) to perform this task, in cooperation with an item identification store 406.

In block 1004, the labeling system 112 associates queries with schema information expressed in a source schema. As described above, the labeling system 112 can perform this task by extracting the titles from the identified items (e.g., pages). The labeling system 112 then uses the titles to identify schema information in the descriptive information store 410. As described above, the descriptive information store 410 may correspond to a product database that provides structured information regarding the items, as expressed in a source schema.

In block 1006, the labeling system 112 associates the queries with schema information in a target schema. This operation can be implemented by mapping the schema information expressed in the source schema (identified in block 1004) to schema information expressed in the target schema. In one example, the target schema is defined by FIG. 2.

In block 1008, the labeling system 112 uses the schema information expressed in the target schema to assign labels to the query.

Figure 11:
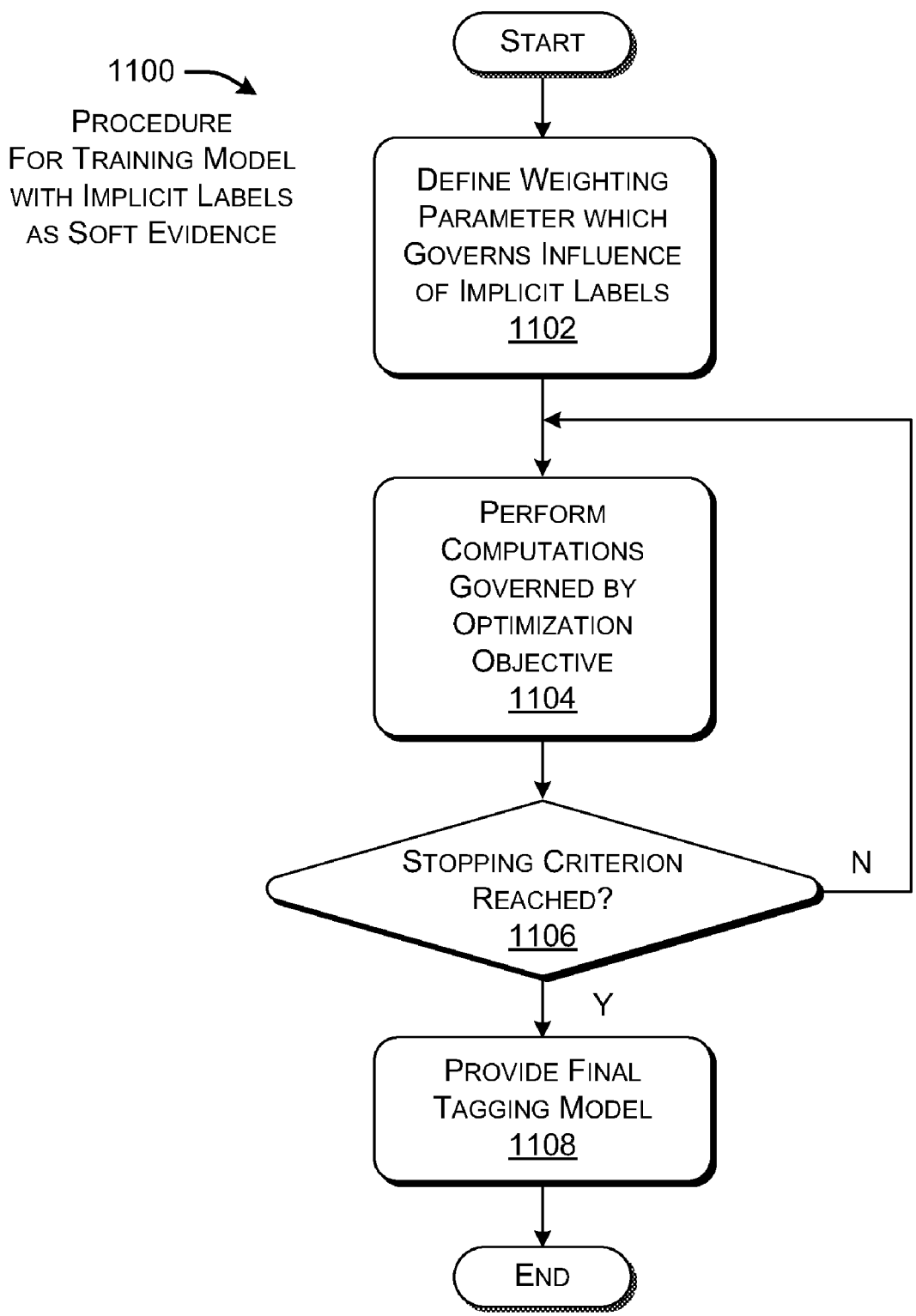
FIG. 11 shows an illustrative procedure for generating a tagging model using an iterative optimization approach.

FIG. 11 shows a procedure for generating the tagging model 102 using the soft evidence approach.

In block 1102, a weighting parameter $\omega$ is selected that defines the influence that the implicit labels will have on the hidden variables of the state sequence. At one extreme, the weighting parameter can be defined such that the implicit labels have no effect. At another extreme, the weighting parameter can be defined such that the implicit labels have a large effect, e.g., essentially constituting hard evidence that fixes the values of the state variables. The weighting parameter $\omega$ can be selected in a manual manner, an automated manner, or a partially automated manner.

In block 1104, the training module 110 performs one iteration of a process which maximizes a training objective, e.g., specified by $\log p(z|x)=\log \Sigma_y p(y, z|x)$. In this expression, z corresponds to implicit label information, x corresponds to query information, and y corresponds to state variable information. In one approach, the training module 110 uses the EM approach to optimize the training objective. In another approach, the training module 110 uses the Viterbi algorithm to optimize the training objective. Both of these approaches adopt a two-step approach to perform optimization (for each iteration).

In block 1106, the training module 110 determines whether a stopping criterion has been reached. If not, the training module 110 performs another iteration of the computations associated with block 1104.

If the stopping criterion has been reached, the training module advances to block 1108, in which the final tagging model 102 is provided, as defined by the model parameters $\Lambda$ produced by the iterative procedure described above.

In the case of a hard evidence approach, the training module 110 can use the same iterative approach shown in FIG. 11, except that block 1102 is omitted and the training objective corresponds to $\log p(y^o|x)=\log \Sigma_y^h p(y^o, y^h|x)$.

Figure 12:
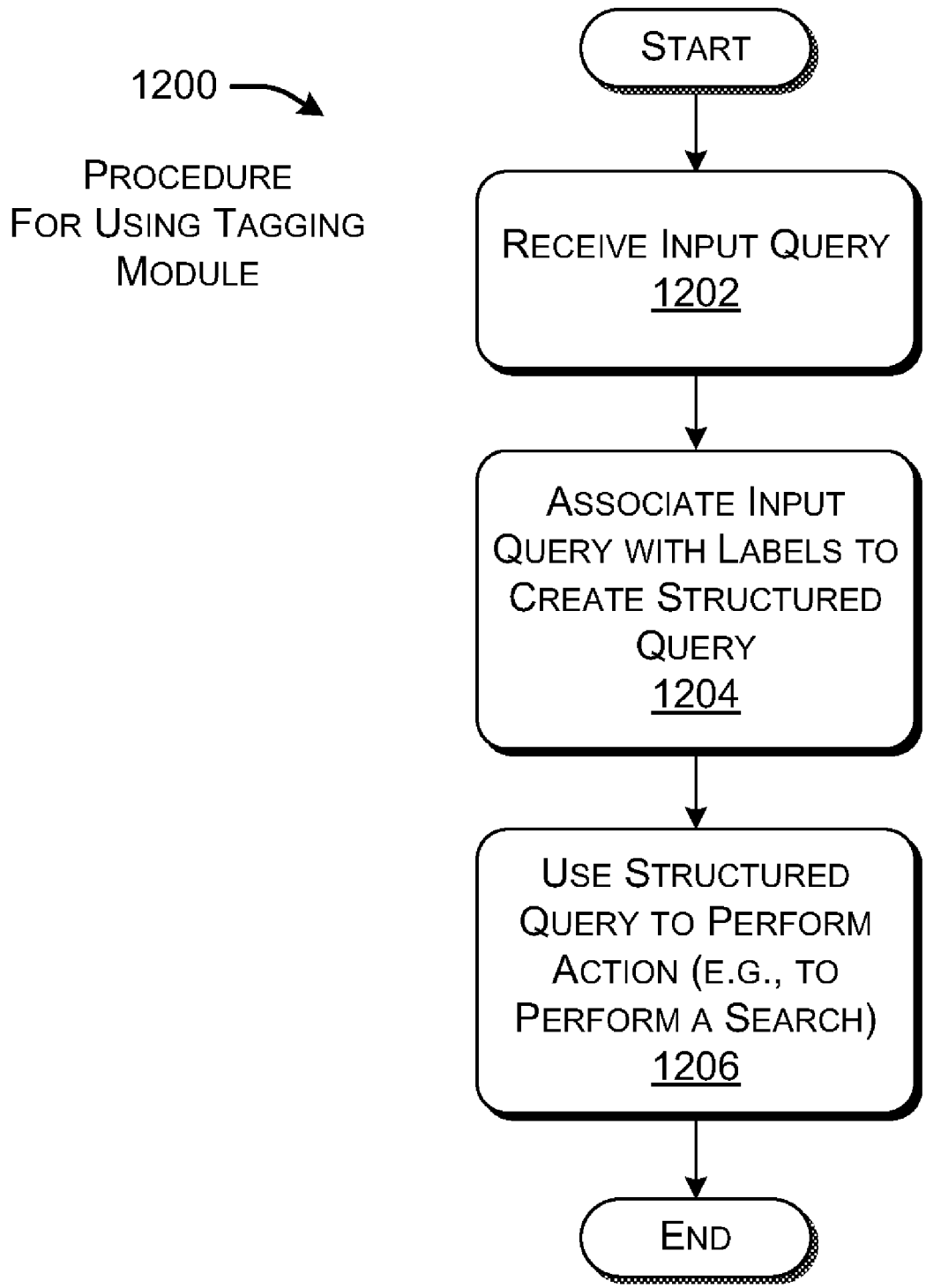
FIG. 12 shows an illustrative procedure for applying a tagging model to label queries.

FIG. 12 shows a procedure 1200 for using the tagging model 102 after it has been trained.

In block 1202, the tagging model 102 receives an input query x.

In block 1204, the tagging model 102 uses the model weights (determined in procedure 1100) to associate the terms in the input query with labels. This operation transforms the input query into a structured query.

In block 1206, the application system 106 uses the structured query to perform an action. For example, the application system 106 can perform a search using the structured query.

C. Representative Processing Functionality

FIG. 13 sets forth illustrative electric computing functionality 1300 that can be used to implement any aspect of the functions described above. With reference to FIGS. 1 and 3, for instance, the type of computing functionality 1300 shown in FIG. 13 can be used to implement any aspect of the training system 104 and/or the application system. As described, the training system 104 and the application system 106 can be distributed between local and remote functionality in any manner. In one case, the processing functionality 1300 may correspond to any type of computing device.

The computing functionality 1300 can include volatile and non-volatile memory, such as RAM 1302 and ROM 1304, as well as one or more processing devices 1306. The processing functionality 1300 also optionally includes various media devices 1308, such as a hard disk module, an optical disk module, and so forth. The processing functionality 1300 can perform various operations identified above when the processing device(s) 1306 executes instructions that are maintained by memory (e.g., RAM 1302, ROM 1304, or elsewhere). More generally, instructions and other information can be stored on any computer readable medium 1310, including, but not limited to, static memory storage devices, magnetic storage devices, optical storage devices, and so on. The term computer readable medium also encompasses plural storage devices. The term computer readable medium also encompasses signals transmitted from a first location to a second location, e.g., via wire, cable, wireless transmission, etc.

The computing functionality 1300 also includes an input/output module 1312 for receiving various inputs from a user (via input modules 1314), and for providing various outputs to the user (via output modules). One particular output mechanism may include a presentation module 1316 and an associated graphical user interface (GUI) 1318. The computing functionality 1300 can also include one or more network interfaces 1320 for exchanging data with other devices via one or more communication conduits 1322. One or more communication buses 1324 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A training module implemented on one or more computers comprised of one or more processors and storage, for training a tagging model, the training module comprising:

logic that receives and stores an explicitly-labeled training set in the storage, the explicitly-labeled training set including explicit labels that have been manually selected;

logic that receives and stores an implicitly-labeled training set in the storage, the implicitly-labeled training set including implicit labels that have been generated by a labeling system; and logic performed by the one or more processors that trains a tagging model based on the explicitly-labeled training set and the implicitly-labeled training set, and that stores the tagging model in the storage, wherein the logic that trains also maximizes a training objective, wherein the training objective is a function of implicit label information, query information, and state variable information.

2. The training module of claim 1, wherein, for the implicitly-labeled training set, said logic configured to train:

treats the implicit labels as fixing state sequence variables that correspond to the implicit labels; and treats any state sequence variable for which there is a missing label as a hidden variable.

3. The training module of claim 1, wherein, for the implicitly-labeled training set, said logic that trains:

treats state sequence variables as hidden variables; and treats the implicit labels as non-binding evidence regarding values of the state sequence variables.

4. The training module of claim 1, wherein said logic configured that trains also maximizes a training objective using an expectation-maximization algorithm.

5. The training module of claim 1, wherein said logic that trains also maximizes a training objective using a Viterbi algorithm.

6. The training module of claim 1, wherein the training objective applies a representation of conditional probability that includes, in part, a soft evidence feature function, wherein the soft evidence feature function expresses an influence of the implicit labels in training the tagging model.

7. The training module of claim 6, wherein the representation of conditional probability includes a weighting parameter that controls an extent of influence of the implicit labels in training the tagging model.

8. A computer readable storage medium storing computer readable instructions, the computer readable instructions providing a training module that when executed by one or more processing devices performs a process comprising:

training a tagging model by optimizing a training objective, wherein the training objective applies a representation of conditional probability that includes, in part, a soft evidence feature function, the soft evidence feature function expressing an influence of implicit labels on hidden state variables.

9. The computer readable storage medium of claim 8, wherein the conditional probability is expressed by:

$$\frac{1}{Z'(x;\Lambda)} \exp\left\{\sum_k \lambda_k \sum_{t=1}^{T+1} f_k(y_{t-1}, y_t, x) + \omega \sum_{t=1}^{T} s(y_t, z_t)\right\},$$

wherein $z_t$ corresponds to implicit label information, x corresponds to observation information, $y_t$ corresponds to state variable information, $\Lambda$ refers to model parameter information, $Z'(x;\Lambda)$ refers to a normalization function, $f_k$ refer to feature functions, $\lambda_k$ refer to weighting parameters applied to the feature functions $f_k$, $s(y_t, z_t)$ refers to the soft evidence feature function, and $\omega$ refers to a weighting parameter applied to the soft evidence feature function.

10. The computer readable storage medium of claim 9, wherein the soft evidence feature function $s(y_t, z_t)$ equals 0 if $z_t$=null, 1 if $y_t=z_t$, and −1 otherwise.

11. A method using electronic computing functionality to provide implicit labels for use in training a statistical tagging model, comprising:

identifying, using the electronic computing functionality, items selected by users in association with queries submitted by the users;

identifying, using the electronic computing functionality, schema information associated with the items;

selecting, using the electronic computing functionality, implicit labels associated with the queries, based on the schema information training a tagging model based, at least in part, on a training set that includes the implicit labels; and using the tagging model to associate terms of an input query with labels to transform the input query to a structured query.

12. The method of claim 11, wherein said identifying items comprises identifying the items from a store which associates queries made by users with selections made by the users.

13. The method of claim 11, wherein the items correspond to network-accessible pages selected by the users.

14. The method of claim 11, wherein the items are associated with respective products.

15. The method of claim 11, wherein said identifying schema information comprises:
  extracting information associated with the items to provide extracted information; using the extracted information to identify descriptive information associated with the items within a descriptive store; and
  providing the schema information based on the descriptive information.

16. The method of claim 15, wherein the extracted information corresponds to titles associated with the items, and wherein said using of the extracted information comprises matching the titles with title information in the descriptive store.

17. The method of claim 15, wherein the descriptive information corresponds to descriptive metadata associated with the items.

18. The method of claim 11, wherein said identifying the schema information comprises:
  identifying schema information expressed in a source schema; and
  mapping the schema information expressed in the source schema to schema information expressed in a target schema.

* * * * *